Figure 1:
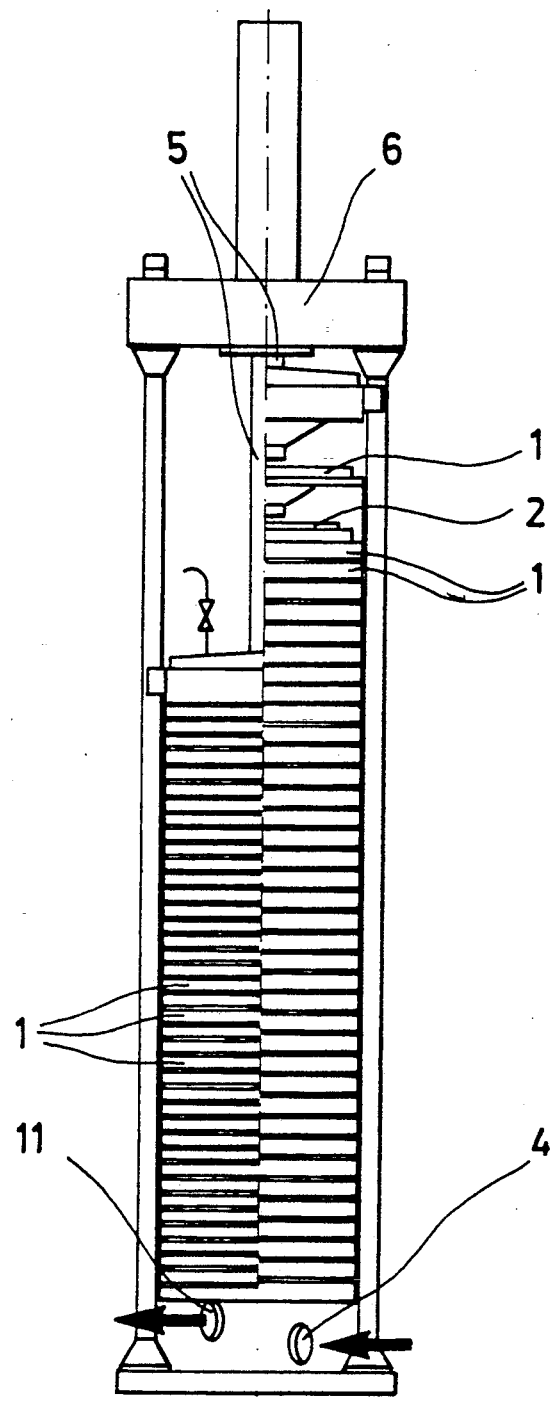

United States Patent [19]

Fast et al.

[11] Patent Number: 5,045,199

[45] Date of Patent: Sep. 3, 1991

[54] STACKED FILTER SUPPORTS WITH CORRESPONDING PROFILE SEALS

[75] Inventors: Udo Fast; Thomas Handtmann, both of Biberach; Wolfgang Kurz; Helmut Schafft, both of Stetten; Peter Westermeier, Warthausen, all of Fed. Rep. of Germany

[73] Assignees: Albert Handtmann Armaturenfabrik GmbH & Co. KG, Fed. Rep. of Germany; EAS Patent- und Knowhow-Verwertungs GmbH, Fed. Rep. of Germany

[21] Appl. No.: 430,352

[22] Filed: Nov. 2, 1989

[30] Foreign Application Priority Data

Nov. 8, 1988 [DE] Fed. Rep. of Germany ....... 8813974

[51] Int. Cl.⁵ ............................................ B01D 29/39
[52] U.S. Cl. .................................. 210/346; 210/450; 210/486; 210/488
[58] Field of Search ............... 210/346, 347, 450, 486, 210/487, 488, 497.2

[56] References Cited

U.S. PATENT DOCUMENTS

| | | | |
|---|---|---|---|
| 2,104,473 | 1/1938 | Watson | 210/486 |
| 2,813,632 | 11/1957 | Muller | 210/486 |
| 3,450,267 | 6/1969 | Jarvis | 210/486 |
| 3,831,763 | 8/1974 | Breysse et al. | 210/346 |
| 3,854,904 | 12/1974 | Jamet | 210/346 |
| 4,647,415 | 3/1987 | Schaft | 264/86 |
| 4,655,919 | 4/1987 | Schaft | 210/236 |
| 4,925,570 | 5/1990 | Schaft | 210/741 |

FOREIGN PATENT DOCUMENTS 3609615 10/1986 Fed. Rep. of Germany .
U8714993 3/1988 Fed. Rep. of Germany .

Primary Examiner—Robert A. Dawson
Assistant Examiner—Wanda L. Millard
Attorney, Agent, or Firm—Finnegan, Henderson, Farabow, Garrett & Dunner

[57] ABSTRACT

This invention relates to a filtering apparatus for filtering liquids, in particular beverages. To attain an effective seal between two superimposed filter supports and the associated filter bodies in such a filtering apparatus, the upper side of an underlying filter support has formed therein a groove which opens upwards and has a substantially trapezoidal cross section and whose interior groove wall is substantially parallel to the inner wall of the apron of the filter support respectively lying thereabove, and the profiled seal has, on the whole, a substantially rectangular cross section, with the profiled seal portion supported on the respectively lower filter support being adapted to the cross section of the groove.

9 Claims, 2 Drawing Sheets

STACKED FILTER SUPPORTS WITH CORRESPONDING PROFILE SEALS

DESCRIPTION

This invention relates to a filtering apparatus used for filtering liquids, in particular beverages, and comprising a plurality of filter supports which are arranged one on top of the other in towerlike fashion and include a central opening, and filter bodies positioned between the filter supports, as well as surrounding profiled seals of which each is disposed between the filter supports on the outer edge of the filter bodies and arranged with an upper portion of a substantially rectangular cross section between an obliquely outwardly and downwardly directed inner wall of a surrounding apron of an upper filter support and the filter body resting on the filter support positioned thereunder, a lower portion of the profiled seal being supported on the upper side of the filter support positioned thereunder.

A filtering apparatus of the above-mentioned type is described in German Utility Model G 87 14 993. Filtering apparatuses of a similar construction are also described in German Patent Specification 32 34 560 and German Patent Application 34 03 738. These are filtering apparatuses consisting of filter supports which are stacked one on top of the other in towerlike fashion and respectively shaped as a downwardly facing truncated cone with a central opening. Radially extending flutings are provided on the upper and lower sides of the filter supports. Two filter supports which are arranged one on top of the other have disposed therebetween a filter body through which the liquid to be filtered passes. The liquid flows at the central opening through the upper fluted channels of a lower filter support and is then pressed through the filter support and flows radially outwards in the fluted channels which are provided on the bottom side of the filter support positioned thereabove. The filter bodies consist of a porous filter material which is bound by a water-soluble binder, mostly sugar, so that the filter bodies have a sufficient inherent strength when the filtering apparatus is assembled, i.e. when the filter supports and the filter bodies are stacked one on top of the other. Prior to the use of the filtering apparatus, water is passed therethrough, whereby the volume of the filter body decreases and the filter body shrinks vertically from about 30 mm to 20 mm while the binder is being flushed out. The filter body is not only defined by the respectively superimposed filter supports, but also by two surrounding seals, an inner one being directly mounted on the central opening, while an outer one is provided on the outer edge of the filter body. On account of these seals, the liquid to be filtered can, on the one hand, only flow through the filter body along the flow path provided therefor, whereby a flow bypass between a filtered liquid and an unfiltered one is prevented. On the other hand, the seals prevent the filter material from exiting. As for the filtering apparatus set forth in German Utility Model G 87 14 993, each filter support has an outlet edge, which is penetrated by vertical channels, at the outside around the first apron. The outer edge of this outlet edge has, for its part, provided thereon surrounding profiled seals which, being inserted into grooves, respectively seal two filter supports relative to each other, with the plurality of filter bodies stacked one on top of the other in towerlike fashion resulting in an annular outlet channel for the filtered liquid. Since prior to the putting into opertion of the filtering apparatus, the filter body shrinks vertically by about one third when the binder is flushed out of the filter body, the profiled seals must be capable of participating in this shrinking process. Moreover, the filter supports are held together at a predetermined pressure by vertically acting pressing elements, usually a hydraulic device, so as to attain a filter material density that is desired for the filtering process. The profiled seal of the known filter resting on the filter body at the outside is provided in its lower portion with a large air chamber extending in the longitudinal profile direction so that the seal can participate in the shrinking process. This air chamber has the effect that the profiled seal can vertically yield by an amount corresponding to that by which the filter body shrinks when the binder is flushed out. During shrinking the lower portion of the profiled seal lies down, like the lower leg of a L section, on the upper side of the filter support respectively located thereunder. On the periphery of the outlet edge the outer profiled seal has a substantially circular cross section with an upper web and a lower web which are added and respectively engage into the grooves of the superimposed filter supports. This profiled seal has also provided therein a hollow chamber which extends in the longitudinal direction of the profile so that the shrinking process can be compensated for.

These seals have the disadvantage that the lower portion of the profiled seal stiffens when the downward movement of the filter supports increases during the shrinking of the filter body. The pressure exerted by the hydraulic device in the vertical direction on the filtering apparatus is thus partly intercepted in an uncontrolled way by the profiled seals between the filter supports so that the density of the filter material can no longer definitely be inferred from the hydraulic pressure applied. Moreover, an increased hydraulic pressure becomes necessary as a major part of the pressure is intercepted through the profiled seals. Another problem arising in connection with the known profiled seals consists in that during operation air diffuses from the cavities through the seal wall to the outside so that when the filter bodies are replaced, the seals can often not be used again because they have collapsed in the area of the cavities and no longer have the elasticity required.

It is therefore the object of the present invention to improve a filtering apparatus of the above-mentioned type in such a way that an effective seal is respectively accomplished between two superimposed filter supports and the associated filter bodies, and that the seals can be used again and affect the bias of the filter bodies as little as possible.

This object is achieved by the invention in that the upper side of the underlying filter support has formed therein a groove which opens upwards and has a substantially trapezoidal cross section and whose interior groove wall is substantially parallel to the apron of the respectively underlying filter support, and that the profiled seal has, on the whole, a substantially rectangular cross section, with the profiled seal portion supported on the respectively lower filter support being adapted to the cross section of the groove.

This achievement has the advantage that the profiled seal is now fixedly inserted into the respectively lower filter while during the shrinking process the filter support positioned thereabove can settle downwards when the binder is flushed out, with the obliquely outwardly directed inner wall of the downwardly facing apron of the filter body respectively positioned thereabove sliding along the outer side of the profiled seal having a rectangular cross section. As a result of the inventive arrangement, the upper filter support can subside to a relatively great extent without the surrounding profiled seal being very strongly compressed. The profiled seal may therefore be of a relatively solid construction and can thus be used several times without difficulty. On account of the relatively easy displaceability the pressure exerted by the biasing means in vertical direction on the filter supports is more or less fully applied to the filter bodies so that the density of the filter material can directly be inferred from the biasing force.

The load on the seal, in particular in comparison with the liquid pressure, can be decreased in an advantageous way in that the interior groove wall of the trapezoid groove of the respectively lower filter support and the inner wall of the apron of the respectively upper filter support vertically overlap, at least almost entirely, when the filtering apparatus is in the operative state. Operative state means here the state of the filtering apparatus in which said apparatus is after the binder has been flushed out of the filter bodies, i.e. after the filter bodies have shrunk. This arrangement between the interior groove wall of the trapezoid groove and the inner wall of the apron has the effect that the profiled seal cannot bulge outwards.

With filtering apparatuses of the above-mentioned type, in the case of which each filter support comprises an outlet edge for the filtered liquid outside of the profiled seal, with the outlet edges of two superimposed filter supports having respectively provided therebetween a second surrounding profiled seal for forming an outwardly sealed, vertical outlet channel between the first profiled seal and the outer, second profiled seal, it is especially advantageous when a downwardly projecting, second apron with an obliquely outwardly extending inner wall is respectively formed at the bottom side of the outer edge as a contact surface for the outer, second profiled seal, and when the top side of the outer outlet edge of the respectively underlying filter support has formed thereon an upwardly opening, surrounding groove of a substantially trapezoidal cross section for receiving the second profiled seal, the interior wall of the groove being substantially in parallel with the inner wall of the second apron.

Owing to this design of the outer outlet edge of the filter body the second profiled seal may be of the same construction as the first profiled seal. The mode of operation is the same in both cases. The oblique arrangement of the inner wall of the second apron and the interior groove wall which is parallel thereto have the effect that the filter supports can settle without the profiled seals being excessively compressed. Moreover, an automatic centering is accomplished through the oblique arrangement when the filter supports are stacked one upon the other in towerlike fashion.

It has been found to be advantageous when in the case of the outer groove for the second profiled seal the interior groove wall vertically projects over the exterior groove wall and has about the same height as the second profiled seal. The second profiled seal is thus supported over its entire height while the second apron of the filter support positioned thereabove slides down along the outer side of the seal during the shrinking process of the filter bodies.

An angle of about 10° to 25° between the inner wall of the apron and the vertical is considered to be especially advantageous. This applies likewise to the first apron and the second apron which are preferably parallel to each other.

When the first and second profiled seals have the same cross section, stockkeeping is considerably simplified because the same seal profile can be used for the sealing of both the filter bodies and the filter supports.

The sealing effect of the profiled seals can additionally be enhanced by providing the upper portion of the profiled seals, which is located outside of the groove, with sealing lips which extend in the longtudinal direction of the seal and are arranged one on top of the other in the fashion of evergreen trees. These sealing lips help to compress the seal profile and thus additionally reduce the resistance of the profiled seals during the shrinking process of the filter bodies when liquid is flushed through the filtering apparatus for removing the binder.

For the same reason, it is advantageous when the upper portion of the profiled seals which is located outside of the groove is provided with a plurality of superimposed air chambers extending in the longitudinal direction of the seal. These air chambers are naturally very small so that they slightly improve the elasticity of the profiled seals, but do not allow any major deformations.

Figure 2:
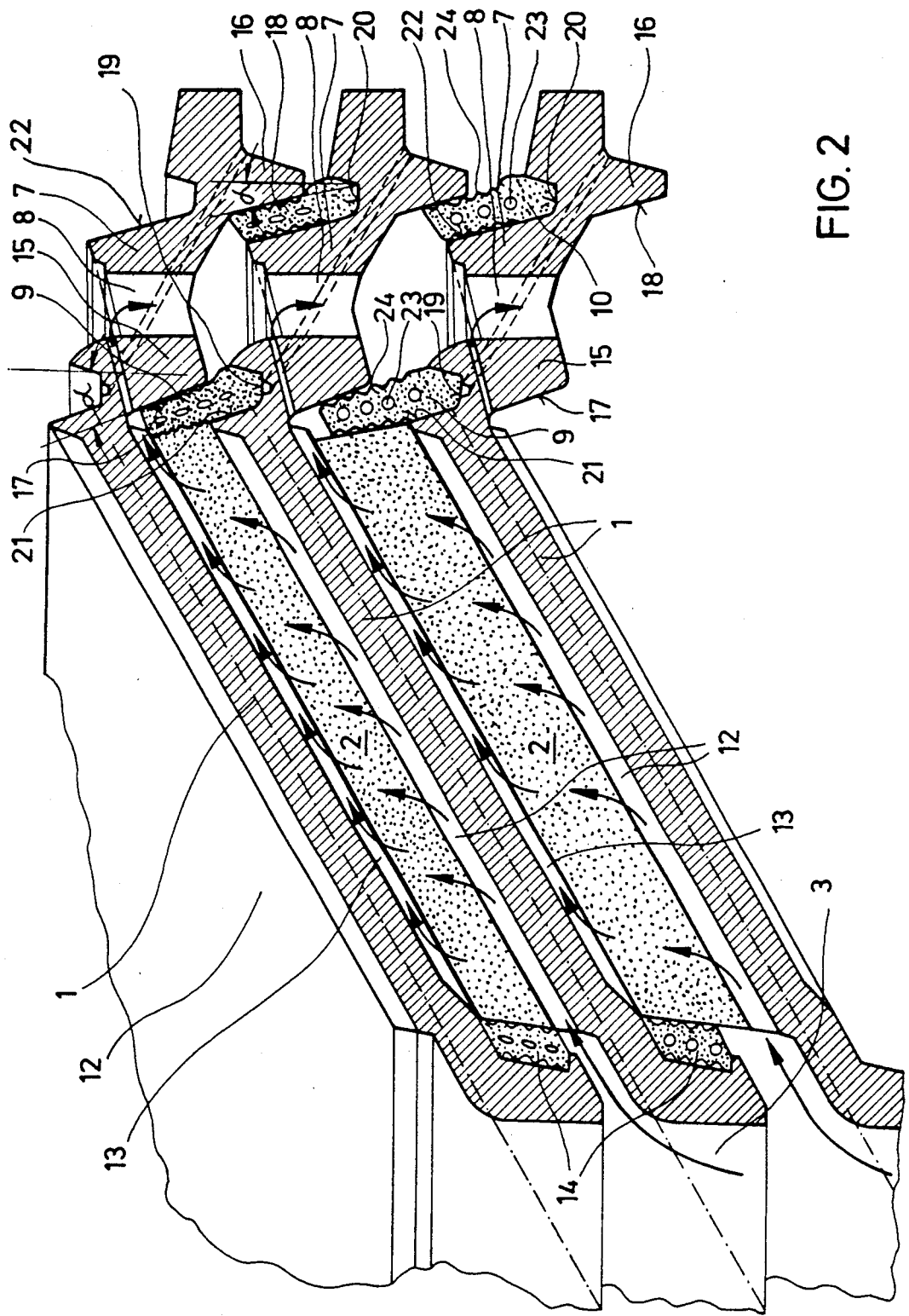

An embodiment of the invention will now be explained in greater detail with reference to a drawing, in which FIG. 1 shows a general view of a filtering apparatus of the invention, and FIG. 2 shows an enlarged detail view of a section through a plurality of superimposed filter supports.

FIG. 1 shows a filtering apparatus of the invention for filtering liquids, in particular beverages. The filtering apparatus consists of a tower of superimposed filter supports 1 between which filter bodies 2 are arranged (see FIG. 2). The filter supports 1 include a central opening 3 so that a central inflow channel which is connected to a supply line 4 at the bottom is formed in the middle portion of the filtering apparatus. A hydraulic piston 5 which is mounted on a cross member 6 presses against the uppermost filter support 1 from the top.

The right half of FIG. 1 shows the filtering apparatus after the filter supports 1 have been stacked one on top of the other and before the filtering apparatus is flushed to remove the binder from the filter bodies, whilst the left half of FIG. 1 shows the apparatus in the operative state, i.e. after flushing.

As can more clearly be seen from FIG. 2, the filter supports have their radially outer side provided with an outlet edge 7, which is respectively penetrated by a plurality of axial bores 8. The outlet edge 7 is sealed, both radially outwards and radially inwards, relative to the filter body 2 by a profiled seal 9 and 10, respectively, so that in the area of the outlet edge 7 a vertically extending annular channel which terminates at the bottom of the filtering apparatus in an outlet 11 is formed by the filter supports 1 which are stacked one on top of the other in towerlike fashion. Such an apparatus is also described in German Utility Model G 87 14 993 in greater detail.

As can more clearly be seen from FIG. 2, the filter supports have the shape of a truncated cone and point downwards in funnel-like fashion. Rib fields 12 and 13 with radially extending ribs between which the liquid to be filtered can flow through are respectively provided on the upper side and the lower side of a filter support 1. The flow path of the liquid is outlined in FIG. 2 by means of arrows.

The filter bodies 2 respectively rest on the upper rib field 12 of the respectively lower filter support 1. At their upper side they are covered by the lower rib field of the filter support 1 respectively positioned thereabove. The filter bodies 2 are radially inwardly and radially outwardly sealed by a profiled seal 14 and the profiled seal 9. As becomes apparent from the illustration of FIG. 2, the upper filter body 2 is thinner than the lower filter body 2'. The lower filter body 2' is to show the filter body state before the binder (sugar) is flushed out of the filter body. By contrast, the binder has already been flushed out from the filter body 2 so that the filter body 2 has already settled. While the inner profiled seal is substantially designed in the same way as in German Utility Model 81 14 993, the first profiled seal 9 and the outer, second profiled seal 10 have been arranged in a specific way.

As becomes apparent, the filter supports 1 comprise a downwardly facing, first inner apron 15 and a second outer apron 16, radially spaced therefrom, at their upper side on the outer edge, with the outer apron 16 being here arranged further downwards in axial direction than the inner apron 15. Both aprons 15 and 16 have obliquely outwardly directed inner walls 17 and 18 on which the outer side of the profiled seals 9 and 10 rests. In the embodiment which is here shown, the angle α of the obliquely outwardly extending inner walls 17 and 18 is 20° relative to the vertical.

Corresponding to the aprons 15 and 16, upwardly opening grooves 19 and 20 of a trapezoidal cross section are provided on the upper side of the respectively underlying filter support. The radially interior groove wall 21 and 22, respectively, is substantially in parallel with the inner wall 17 and 18, respectively, of the associated apron 15 and 16, respectively. Both profiled seals 9 and 10 have a substantially rectangular cross section. However, the lower end inserted into the groove 19 and 20, respectively, is matched to the trapezoidal shape of the groove. As a result, the profiled seal above the groove 19 and 20, respectively, is here slightly thicker than in the remaining portion.

The inner groove wall 21 of the first groove 19 slightly projects over the outer groove wall of the groove 19 so that in the operative state, i.e. when the filter body 2 is compressed, the groove wall 21 and the inner wall 17 of the first apron 15 vertically overlap.

By contrast, the inner groove wall 22 of the outer trapezoid groove 20 projects over the groove 20 to a considerably greater degree and the height thereof approximately corresponds to the height of the second profiled seal 10. As a result, the second profiled seal 10 is with its inner side in entire surface contact with the inner groove wall 22 and supported by the same.

As is clearly shown by FIG. 2, the first profiled seal and the second profiled seal have the same cross section. In the area projecting from the groove 19 and 20, respectively, the profiled seals 9 and 10 comprise sealing lips 24 which are arranged one on top of the other in the fashion of evergreen trees and extend in the longitudinal profile direction. In the interior of the area located outside of the groove 19 and 20, respectively, the profiled seals 9 and 10 are penetrated by cavities 23 extending in the longitudinal profile direction.

The operation of the filtering apparatus of the invention will now be explained in greater detail in the following.

First, as becomes apparent from the right half of FIG. 1, filter supports 1 and filter bodies 2' are alternately stacked one on top of the other, with the profiled seals 9 and 10 being already inserted into the grooves 19 and 20 of the filter supports. As can be seen from the lower portion in FIG. 2, the filter body 2' still includes binders and is therefore relatively high. The profiled seals 9 and 10 are still relatively unstressed, the cavities 23 are open and the sealing lips 24 are hardly deformed. It can easily be imagined that the filter supports are automatically centered by virtue of the oblique arrangement of the profiled seals 9 and 10 when these supports are stacked one on top of the other. In the state shown in the lower half of FIG. 2, the profiled seals 9 and 10 already effect a seal between the superimposed filter supports, on the one hand, and the filter supports and the filter bodies 2', on the other hand. After all of the filter bodies have been stacked, water is flushed through the filtering apparatus. The water then flows through the filter bodies 2', as shown by the arrows, and frees the filter material from the binder, such as sugar. The binder is flushed through the vertical bores 8 in the outlet edge 7 and is then discharged from the filtering apparatus through the outlet 11. During this flushing operation the volume of the filter body 2 decreases, and that is why the filtering apparatus settles (see left half of FIG. 1). This means that the respectively upper filter support 1 moves vertically towards the respectively lower filter support 1. The respectively upper filter supports slide here with the inner walls 17 and 18 of their aprons 15 and 16 along the outer sides of the profiled seals 9 and 10, with the latter being slightly compressed in the direction of thickness, as can be seen from the upper half of FIG. 2. After the binder has entirely been washed out of the filter bodies 2, pressure is exerted through the hydraulic piston 5 on the column standing on the filter supports 1, whereby the respectively desired density is imparted to the filter material. As becomes apparent from the upper half of FIG. 2, the outer apron 16 is additionally supported with its lower edge on a slightly outwardly bulging member of the second profiled seal 10, whereby the sealing effect is even further improved there.

The filtering apparatus can now be put into operation, with the liquid to be filtered flowing through the apparatus, as shown by the arrows.

When the filter bodies are replaced, the profiled seals 9 and 10 may remain in situ. They need not be replaced because they are solid enough to withstand all loads several times.

We claim:

1. A filtering apparatus for filtering liquids, comprising:
   (a) a plurality of filter supports stacked vertically one on top of the other;
   (b) each of said filter supports having a central opening and an outer edge radially spaced from said central opening, said central openings forming a central channel in the middle portion of said apparatus;
   (c) a plurality of filter bodies each supported on a corresponding filter support, positioned between adjacent filter supports and extending radially outwardly from said central channel toward an outer edge thereof;

(d) a plurality of first profiled seals each disposed between adjacent filter supports at the outer edge of a corresponding filter body;

(e) a first apron member depending obliquely outwardly and downwardly from each of said filter supports and having an inner wall; and (f) a first groove formed on the upper side of each of said filter supports, said first groove opening upwardly, having a substantially trapezoidal cross section and having an interior groove wall substantially parallel with the inner wall of the apron member of the adjacent overlying filter support;

each of said first profiled seals having (1) an upper portion of a substantially rectangular cross section positioned between the inner wall of the apron member of the adjacent overlying filter support and the outer edge of its corresponding filter body and (2) a lower portion conforming to the cross section of the first groove in the corresponding filter support and fitted into said first groove.

2. A filtering apparatus according to claim 1, wherein each of said filter supports further comprises an outlet edge portion for filtered liquid radially outward of said first profiled seal, the outlet edge portions of each two adjacent filter supports having provided therebetween a second profiled seal for forming an outer sealed, vertical outlet channel between the first profiled seal and the second profiled seal, and wherein a second downwardly projecting apron member having an obliquely outwardly extending inner wall depends from the bottom side of the outer edge portion of the lower of the two adjacent filter supports to provide a contact surface for the second profiled seal, the top side of the outer edge of said lower filter support has formed thereon an upwardly opening second groove of a substantially trapezoidal cross section for receiving the second profiled seal, and said second groove has an exterior wall and an interior wall substantially parallel with the inner wall of the second apron member.

3. A filtering apparatus according to claim 2, wherein the interior wall of the second groove vertically projects above the exterior wall of said second groove and has about the same height as the second profiled seal.

4. A filtering apparatus according to claim 2, wherein the angle between the inner wall of each apron member and the vertical is from about 10° to 25°.

5. A filtering apparatus according to claim 2, wherein the first and second profiled seals have the same cross section.

6. A filtering apparatus according to claim 2, wherein the upper portion of each profiled seal located outside of its corresponding groove is provided with sealing lips extending in the longitudinal direction of the seal and arranged one above the other.

7. A filtering apparatus according to claim 2, wherein the upper portion of each profiled seal located outside of its corresponding groove is provided with a plurality of superimposed interior air chambers extending in the longitudinal direction of the seal.

8. A filtering apparatus according to claim 1, wherein the interior groove wall of each filter support and the inner wall of the apron of each overlying filter support vertically overlap when the filtering apparatus is in the operative state.

9. A filtering apparatus according to claim 1, wherein the angle between the inner wall of the first apron member and the vertical is from about 10° to 25°.

* * * * *

UNITED STATES PATENT AND TRADEMARK OFFICE
CERTIFICATE OF CORRECTION

PATENT NO. : 5,045,199

DATED : September 3, 1991

INVENTOR(S) : Udo FAST, Thomas Handtmann, Wolfgang Kurz, Helmut Schaft and Peter Westermeier It is certified that error appears in the above-identified patent and that said Letters Patent is hereby corrected as shown below:

TITLE PAGE:

Item [75] Inventors, change "Wolfgang Kurz; Helmut Schafft; both of Stetten;" to --Wolfgang Kurz, Stetten; Helmut Schafft, Mogglingen;--

Signed and Sealed this

Fifth Day of January, 1993

Attest:

DOUGLAS B. COMER

Attesting Officer

Acting Commissioner of Patents and Trademarks